United States Patent
Fukushima

(10) Patent No.: US 12,066,913 B2
(45) Date of Patent: Aug. 20, 2024

(54) STORAGE SYSTEM HAVING MULTIPLE MANAGEMENT CONTROLLERS FOR DETECTING A FAILURE

(71) Applicant: Hitachi, Ltd., Tokyo (JP)

(72) Inventor: Madoka Fukushima, Tokyo (JP)

(73) Assignee: HITACHI, LTD., Tokyo (JP)

(*) Notice: Subject to any disclaimer, the term of this patent is extended or adjusted under 35 U.S.C. 154(b) by 282 days.

(21) Appl. No.: 17/687,756

(22) Filed: Mar. 7, 2022

(65) Prior Publication Data

US 2022/0413981 A1 Dec. 29, 2022

(30) Foreign Application Priority Data

Jun. 25, 2021 (JP) .................................. 2021-105377

(51) Int. Cl.
| | |
|---|---|
| G06F 21/00 | (2013.01) |
| G06F 11/07 | (2006.01) |
| G06F 11/30 | (2006.01) |
| G06F 11/36 | (2006.01) |
| G06F 21/54 | (2013.01) |

(52) U.S. Cl.
CPC ...... G06F 11/3034 (2013.01); G06F 11/0757 (2013.01); G06F 11/0772 (2013.01); G06F 11/0793 (2013.01); G06F 11/3604 (2013.01)

(58) Field of Classification Search
CPC ............ G06F 11/3034; G06F 11/0757; G06F 11/0772; G06F 11/0793; G06F 11/3604
USPC ........................................................ 726/22
See application file for complete search history.

(56) References Cited

U.S. PATENT DOCUMENTS

| | | | |
|---|---|---|---|
| 6,675,258 B1* | 1/2004 | Bramhall | G06F 11/1433 714/E11.135 |
| 9,985,893 B2* | 5/2018 | Lin | H04L 41/0654 |
| 10,740,468 B2 | 8/2020 | Shivanna et al. | |
| 11,132,191 B2* | 9/2021 | Chintagunta | G06F 8/658 |
| 11,288,122 B1* | 3/2022 | Fleisher | G06F 1/187 |
| 2006/0080518 A1* | 4/2006 | Dellacona | G06F 21/70 711/163 |
| 2007/0180329 A1* | 8/2007 | Lanus | G06F 11/004 714/E11.144 |
| 2011/0191547 A1* | 8/2011 | Yoshii | G06F 3/0613 711/147 |

(Continued)

Primary Examiner — Haresh N Patel
(74) Attorney, Agent, or Firm — MATTINGLY & MALUR, PC

(57) ABSTRACT

A first storage controller includes a first input and output controller performs input and output processing on host data, and a first management controller. A second storage controller includes a second input and output controller performs input and output processing on host data, and a second management controller. The first management controller is configured to verify software to be executed by the first management controller and software to be executed by the first input and output controller. The second management controller is configured to verify software to be executed by the second management controller and software to be executed by the second input and output controller. The first management controller is configured to verify the software to be executed by the second input and output controller in place of the second management controller when a failure is detected from the second management controller.

9 Claims, 11 Drawing Sheets

(56) References Cited

U.S. PATENT DOCUMENTS

| | | | | |
|---|---|---|---|---|
| 2012/0144223 | A1* | 6/2012 | Kasahara | G06F 11/3006 |
| | | | | 713/340 |
| 2012/0297202 | A1* | 11/2012 | Gallet | G06F 21/81 |
| | | | | 713/189 |
| 2013/0282885 | A1* | 10/2013 | Rogers | H04L 41/0661 |
| | | | | 709/223 |
| 2014/0344534 | A1* | 11/2014 | Kato | G06F 3/0689 |
| | | | | 711/154 |
| 2018/0096154 | A1* | 4/2018 | Shivanna | G06F 21/572 |
| 2018/0150233 | A1* | 5/2018 | Hanzawa | G06F 3/0619 |
| 2019/0238694 | A1* | 8/2019 | Shirasaki | H04N 1/0049 |
| 2020/0293229 | A1* | 9/2020 | Wang | G06F 11/0727 |
| 2021/0365320 | A1* | 11/2021 | Jeansonne | G06F 11/1048 |
| 2022/0147364 | A1* | 5/2022 | Li | G06F 15/17306 |
| 2022/0335119 | A1* | 10/2022 | Kudo | G06F 21/604 |
| 2023/0131475 | A1* | 4/2023 | Suko | G06F 8/65 |
| | | | | 717/170 |

* cited by examiner

| 311 | 312 | 313 | 310 |
|---|---|---|---|
| DEVICE | LOCATION ID | SW VER. | |
| MGC | 1 | 88-01-06/00 | |
| DKC | 1 | 88-01-04-00/00 | |
| MGC | 2 | 88-01-06/00 | |
| DKC | 2 | 88-01-04-00/00 | |
| | | | |

SOFTWARE INFORMATION TABLE

*FIG. 5*

| 321 | 322 | 323 | 324 | 320 |
|---|---|---|---|---|
| DATE | DEVICE | LOCATION ID | RESULT | |
| 2021/3/22 0:00:00 | MGC | 1 | OK | |
| 2021/3/22 0:00:00 | DKC | 1 | OK | |
| 2021/3/22 0:00:00 | MGC | 2 | OK | |
| 2021/3/22 0:00:00 | DKC | 2 | OK | |
| ... | ... | ... | ... | |

CHECK RESULT MANAGEMENT TABLE

*FIG. 6*

| 331 | 332 | 330 |
|---|---|---|
| DATE | MGC LOCATION ID | |
| 2021/3/22 0:00:00 | 1 | |
| 2021/3/22 0:00:00 | 2 | |
| 2021/3/23 0:00:00 | 1 | |
| 2021/3/23 0:00:00 | 2 | |
| ... | ... | |
| ... | ... | |
| ... | ... | |

HEARTBEAT INFORMATION TABLE

*FIG. 7*

| MGC ID | DKC ID |
|---|---|
| 1 | 1 |
| 2 | 2 |

MONITORING TARGET DKC MANAGEMENT TABLE

*FIG. 8*

| DATE | EVENT ID | EVENT NAME | SEVERITY | DEVICE | LOCATION ID |
|---|---|---|---|---|---|
| 2021/3/22 01:30:50 | 53d5f29e-f351-46c3-bb9e-edd6e95a0c2f | The heartbeat has reconfirmed. | Info | MGC | 1 |
| 2021/3/5 18:15:22 | cfce5d6f-d5e9-433a-9bac-9d0e0b500b89 | The heartbeat has reconfirmed. | Info | MGC | 1 |
| ... | ... | ... | ... | ... | ... |
| ... | ... | ... | ... | ... | ... |
| ... | ... | ... | ... | ... | ... |

LOG MANAGEMENT TABLE

*FIG. 9*

| DATE | EVENT ID | EVENT NAME | SEVERITY | DEVICE | LOCATION ID |
|---|---|---|---|---|---|
| 2021/3/22 01:30:50 | 3145d0b5-3f7c-462e-b31d-c973c6543a7a | FW has recoverd. | Error | DKC | 1 |
| ... | ... | ... | ... | ... | ... |
| ... | ... | ... | ... | ... | ... |

REPORT MANAGEMENT TABLE

STORAGE SYSTEM HAVING MULTIPLE MANAGEMENT CONTROLLERS FOR DETECTING A FAILURE

CLAIM OF PRIORITY

The present application claims priority from Japanese patent application JP 2021-105377 filed on Jun. 25, 2021, the content of which is hereby incorporated by reference into this application.

BACKGROUND

This invention relates to a storage system and more specifically, relates to verification of software in a storage system.

Data storage is a basic function of a computer system. Most of the computer systems handling massive data store the data to storage apparatuses. A storage system stores data to internal storage media (storage drives) such as hard disk drives (HDDs) and solid state drives (SSDs) and writes or reads data in response to a command from the external.

In recent years, ensuring the supply chain security has increasingly become important; implementing a firmware tampering prevention function to servers has been adopted frequently. For example, U.S. Pat. No. 10,740,468 B discloses a computer system including a first controller and a second controller that can perform the same functions. The first controller verifies integrity of a first root of trust (ROT) and generates an integrity signal indicating the results. The second controller verifies a second ROT, writes the firmware image to the first controller, and verifies integrity of the written firmware image.

SUMMARY

Storage systems are required to work 365 days a year and 24 hours a day. Even if some major component is failed in a storage system, the storage system is required to operate in substantially the same way as normal operation. Accordingly, storage systems have low permissibility for reboot to address a failure, compared to servers. The same applies to ensuring an appropriate security level. In view of the recently increasing attention to the security, especially demanded for a storage system is to keep operating while ensuring an appropriate security level, in addition to good I/O performance that has been demanded so far.

An aspect of this invention is a storage system including: a first storage controller; and a second storage controller. The first storage controller includes: a first input and output controller configured to perform input and output processing on host data; and a first management controller. The second storage controller includes: a second input and output controller configured to perform input and output processing on host data; and a second management controller. The first management controller is configured to verify software to be executed by the first management controller and software to be executed by the first input and output controller. The second management controller is configured to verify software to be executed by the second management controller and software to be executed by the second input and output controller. The first management controller is configured to verify the software to be executed by the second input and output controller in place of the second management controller when a failure is detected from the second management controller.

An aspect of this invention protects a storage system from tampering of the programs to be executed in the storage system without stopping the storage system.

BRIEF DESCRIPTION OF THE DRAWINGS

FIG. 5 provides a configuration example of a software information table;

FIG. 6 provides a configuration example of a check result management table;

FIG. 7 provides a configuration example of a heartbeat information table;

FIG. 8 provides a configuration example of a monitoring target DKC management table;

FIG. 9 provides a configuration example of a log management table;

FIG. 10 provides a configuration example of a report management table;

DETAILED DESCRIPTION OF THE EMBODIMENTS

Hereinafter, embodiments of this invention will be described with reference to the accompanying drawings. In the following description, elements having the same configuration are basically assigned the same reference sign and repetitive explanation is omitted. It should be noted that the following embodiments are merely examples to implement this invention and are not to limit the technical scope of this invention.

The storage system in an embodiment of this specification includes a plurality of storage controllers. Each storage controller includes a management controller and a disk controller. The disk controller processes inputs and outputs of host data. The management controller verifies its own software and the software of the disk controller in the same storage controller. As a result, the reliability of the storage system is enhanced.

When one management controller is failed, another management controller takes over the verification to be performed by the disk controller. This cooperative management in the system can maintain the security level in the normal operation without stopping the system even if a failure occurs in a management controller.

System Configuration

Figure 1:
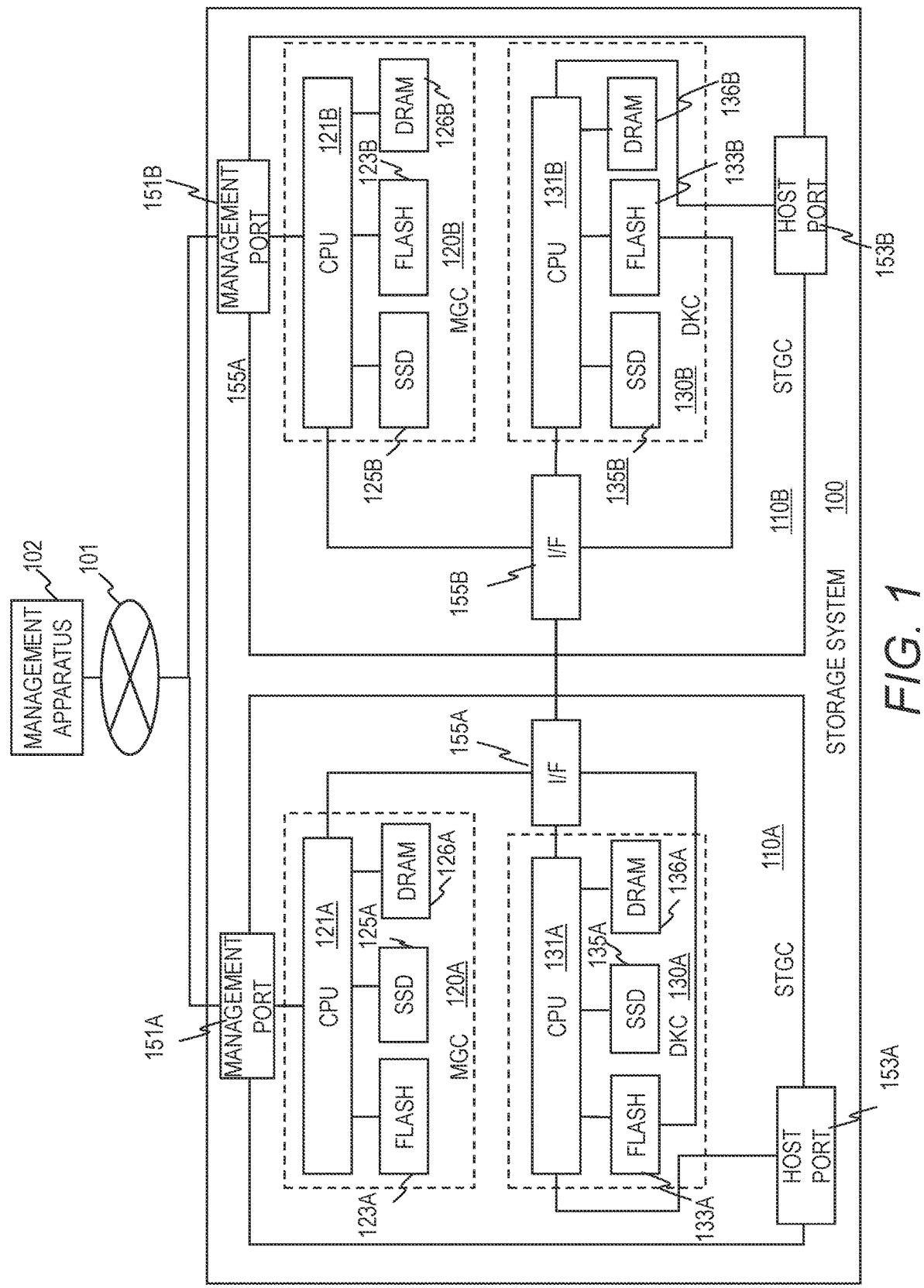
FIG. 1 illustrates an example of hardware configuration of a storage system and apparatuses related thereto.

An example of hardware configuration of a storage system 100 in an embodiment of this specification and apparatuses related thereto is described with reference to FIG. 1. Not-shown one or more hosts connect to the storage system 100 via a not-shown network. Each host sends various requests such as read requests and write requests (I/O requests) to the storage system 100 via the network in order to manage host data. The network can employ a protocol such as Fibre Channel (FC) or Ethernet.

A management apparatus 102 connects to the storage system 100 via a network 101. The system administrator manages the storage system 100 by operating the management apparatus 102. The network 101 can be a local area network (LAN). As will be described later, when software tampering is detected, the information on the tampering is sent to the management apparatus 102. The management apparatus 102 provides the information to the administrator through a display device not shown in FIG. 1.

The management apparatus 102 can have a computer configuration. Specifically, the management apparatus 102 can include a computing device, a primary storage device, an auxiliary storage device, an input device, an output device, and a communication interface. The computing device performs predetermined functions by executing programs stored in the primary storage device. In an example, the programs are loaded from an auxiliary storage device to the primary storage device.

In general, the primary storage device includes a volatile storage medium and the auxiliary storage device includes a non-volatile storage medium. The management apparatus 102 can have any desirable configuration. The input device can be a mouse, a keyboard, or a combination thereof. The output device can be a display device or a printing device.

The storage system 100 includes two storage controllers (STGC) 110A and 110B having the identical functions to enhance the system reliability. The storage system 100 can include not-shown one or more storage drives as storage media for storing data (referred to as host data) from hosts. The storage drives can be hard disk drives (HDDs) or solid state drives (SSDs).

Although described hereinafter is an example of a storage system 100 including two storage controllers 110A and 110B, the number of storage controllers is not limited to a specific one. The storage system can include three or more storage controllers and one storage controller can be distributed in a plurality of nodes that communicate via the network.

The storage controller 110A includes a management controller (MGC) 120A and a disk controller (DKC) 130A. These are different hardware devices. The disk controller is also referred to as input and output controller. The storage controller 110A further includes a management port 151A, a host port 153A, and an internal communication interface 155A.

The management port 151A is an interface for the storage controller 110A to communicate with the management apparatus 102 and the host port 153A is an interface for the storage controller 110 to communicate host data with hosts. The internal communication interface 155A is an interface for the storage controller 110A to communicate with the other storage controller 110B. The internal communication interface 155A stores environmental information and environmental configuration within the system to enable communication among the devices.

The management controller 120A manages the storage system 100 in accordance with instructions from the administrator. For example, the management controller 120A executes configuration of the storage system 100 including creating and configuring a volume.

The management controller 120A includes a central processing unit (CPU) 121A of a computing device for performing management processing, a flash memory 123A, and an SSD 125A. These are different hardware devices. The number of each device is not limited to a specific one. The management controller 120A further includes a DRAM 126A to be used as a primary storage device. A DRAM is a memory including a volatile storage medium.

The CPU 121A executes programs stored in the DRAM 126A to perform predetermined management functions. The processing performed by the CPU 121A is processing performed by the management controller 120A. The CPU 121A communicates with the management apparatus 102 via the management port 151A.

As will be described later, the CPU 121A verifies and activates the software stored in and executed by the management controller 120A and verifies and activates a part of the software stored in the disk controller 130A. The verification determines whether the software is tampered or not. Software verification can be performed with a known technique utilizing digital signatures, for example. Hence, the reliability of the storage system 100 can be enhanced. The verification to be performed by the disk controller 130A can be performed by the management controller 120A; at least a part of the software of the disk controller 130A is verified by the management controller 120A.

The flash memory 123A and the SSD 125A are storage devices different in interface protocol. For example, the flash memory 123A uses serial peripheral interface (SPI) and the SSD 125A uses non-volatile memory express (NVMe). Using different kinds of storage devices enables efficient software storage. The SSD 125A in an embodiment of this specification has a capacity larger than the flash memory 123A. All software can be stored in either one kind of storage device.

In activating the management controller 120A, the CPU 121A first accesses the flash memory 123A to activate the software (programs) stored therein. Thereafter, the CPU 121A accesses the SSD 125A to activate the software in the SSD 125A. As will be described later, the CPU 121A verifies the software in the SSD 125A to determine whether the software is tampered. The CPU 121A also verifies the software in the disk controller 130A. Hence, the security reliability of the storage system 100 is enhanced.

The disk controller 130A processes inputs and outputs of host data. The disk controller 130A stores host data received from a host to a storage drive in accordance with a write request from the host and also retrieves designated data from a storage drive and transfers the data to a host in accordance with a read request from the host. Logically, host data is stored to a volume, which is associated with a storage area of a storage drive.

The disk controller 130A includes a CPU 131A of a computing device for performing input and output processing on host data, a flash memory (first storage device) 133A, and an SSD (second storage device) 135A. These are different hardware devices. The disk controller 130A further includes a DRAM 136A to be used as a primary storage device.

The CPU 131A executes programs stored in the primary storage device to perform predetermined input and output functions. The processing performed by the CPU 131A is processing performed by the disk controller 130A. The CPU 131A communicates with hosts via the host port 153A.

As will be described later, the CPU 131A verifies and activates the software stored in and executed by the disk controller 130A. The verification determines whether the software is tampered or not. Hence, the reliability of the storage system 100 can be enhanced.

The flash memory 133A and the SSD 135A are storage devices different in interface protocol. For example, the flash memory 133A uses SPI and the SSD 135A uses NVMe. Using different kinds of storage devices enables efficient software storage. In an embodiment of this specification, the SSD 135A has a capacity larger than the flash memory 133A. All software can be stored in either one kind of storage device.

The disk controller 130A starts in accordance with a notice from the management controller 120A. Before start of the disk controller 130A, a part of the software of the disk controller 130A is verified by the management controller 120A. If no tampering is detected, startup of the disk controller 130 begins.

In an embodiment of this specification, the management controller 120A verifies the software stored in the flash memory 133A. The management controller 120A can access the flash memory 123A via the internal communication interface 155A without using the CPU 131A. The internal communication interface 155A in an embodiment of this specification is wired to the flash memory 133A but is not wired to the SSD 135A. This configuration achieves a simpler circuit configuration.

After verification by the management controller 120A, the disk controller 130A accesses the flash memory 133A and activates the verified software and further, verifies the remaining part of its software to determine whether the software is tampered. In an embodiment of this specification, the remaining part is the software stored in the SSD 135A. Hence, the security reliability of the storage system 100 is enhanced.

As will be described later, an embodiment of this specification executes the activation of the software in the flash memory 133A in parallel to the verification and activation of the software in the SSD 135A. This configuration can reduce the startup time of the disk controller 130A.

In an embodiment of this specification, the storage controller 110B has the same configuration as the storage controller 110A and includes the same kinds of components. Specifically, the storage controller 110B includes a management controller 120B and a disk controller 130B. The storage controller 110B further includes a management port 151B, a host port 153B, and an internal communication interface 155B. Communication between the storage controllers 110A and 110B is made through the internal communication interfaces 155A and 155B.

The management controller 120B includes a CPU 121B, a flash memory 123B, and an SSD 125B, like the management controller 120A. The management controller 120B further includes a DRAM 126B to be used as a primary storage device. The disk controller 130B includes a CPU 131B, a flash memory 133B, and an SSD 135B, like the disk controller 130A. The disk controller 130B further includes a DRAM 136B to be used as a primary storage device.

The CPU 121B of the management controller 120B can access the flash memory 133B in the disk controller 130B through the internal communication interface 155B. The internal communication interface 155B is wired to the flash memory 133B but is not wired to the SSD 135B.

The management controller 120B and the disk controller 130B operate in the same way as the above-described management controller 120A and disk controller 130A, respectively. The management controllers 120A and 120B can have different configurations and the disk controllers 130A and 130B can have different configurations.

The storage controllers 110A and 110B are configured to be redundant. When one is failed, the other takes over the processing to be performed by the failed one. As will be described in detail later, when one of the two management controllers 120A and 120B is failed, the other one takes over its processing.

As described above, each of the management controllers 120A and 120B verifies the software to be executed by itself and the software of the disk controller in the same storage controller. Accordingly, when one management controller, for example, the management controller 120B, is failed, the redundant management controller 120A verifies the software of the disk controller 130B, in place of the management controller 120B. The CPU 121A of the management controller 120A accesses the flash memory 133B of the disk controller 130B through the internal communication interfaces 155A and 155B.

Figure 2:
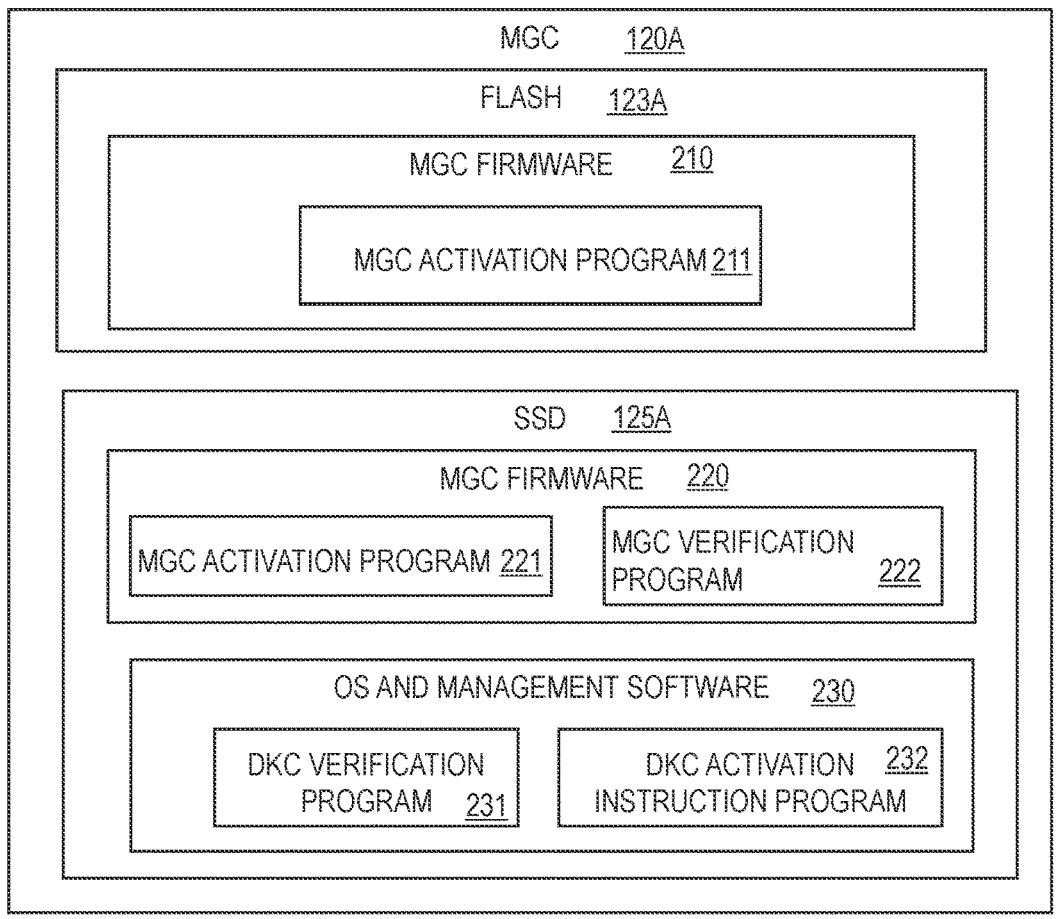
FIG. 2 illustrates a configuration example of software (programs) stored in a management controller.

FIG. 2 illustrates a configuration example of software (programs) stored in the management controller 120A. The management controller 120B of the storage controller 110B stores the same software as the management controller 120A. The flash memory 123A of the management controller 120A stores MGC firmware 210. The MGC firmware 210 includes an MGC activation program 211.

The SSD 125A of the management controller 120A stores MGC firmware 220 and further, an operating system (OS) and management software 230. The management software runs on the OS. The MGC firmware 220 includes an MGC activation program 221 and an MGC verification program 222. The OS and management software 230 include a DKC verification program 231 and a DKC activation instruction program 232.

Figure 3:
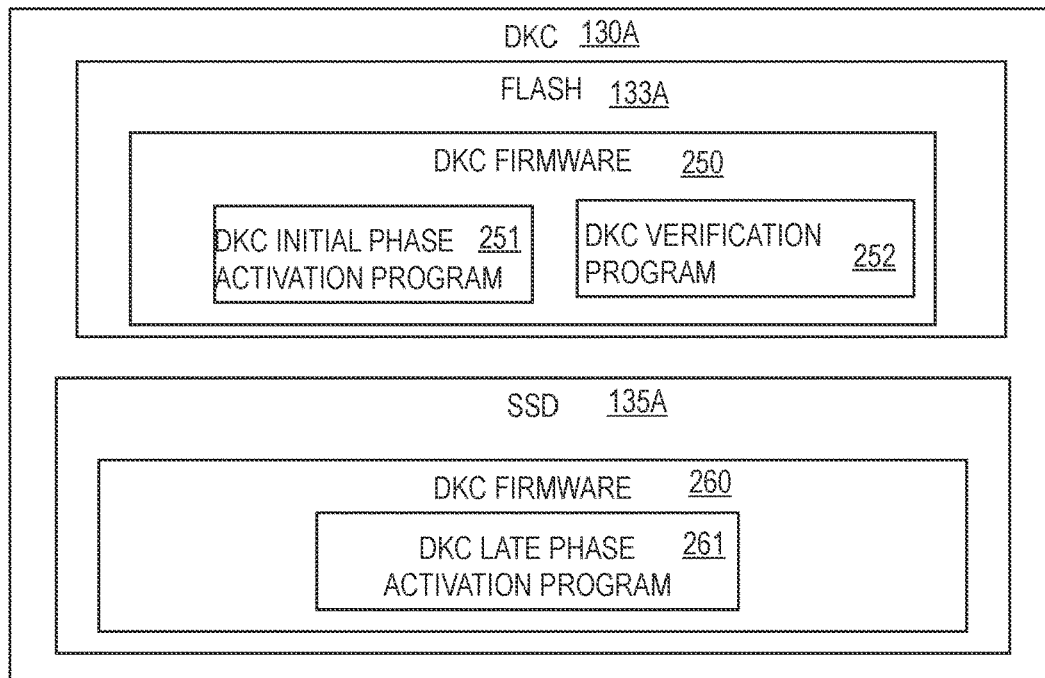
FIG. 3 illustrates a configuration example of software (programs) stored in a disk controller.

FIG. 3 illustrates a configuration example of software (programs) stored in the disk controller 130A. The disk controller 130B of the storage controller 110B stores the same software as the disk controller 130A.

The flash memory 133A of the disk controller 130A stores a DKC firmware 250. The DKC firmware 250 includes a DKC initial phase activation program 251 and a DKC verification program 252. The SSD 135A of the disk controller 130A stores DKC firmware 260. The DKC firmware 260 includes a DKC late phase activation program 261.

Outline of Startup Processing

Figure 4:
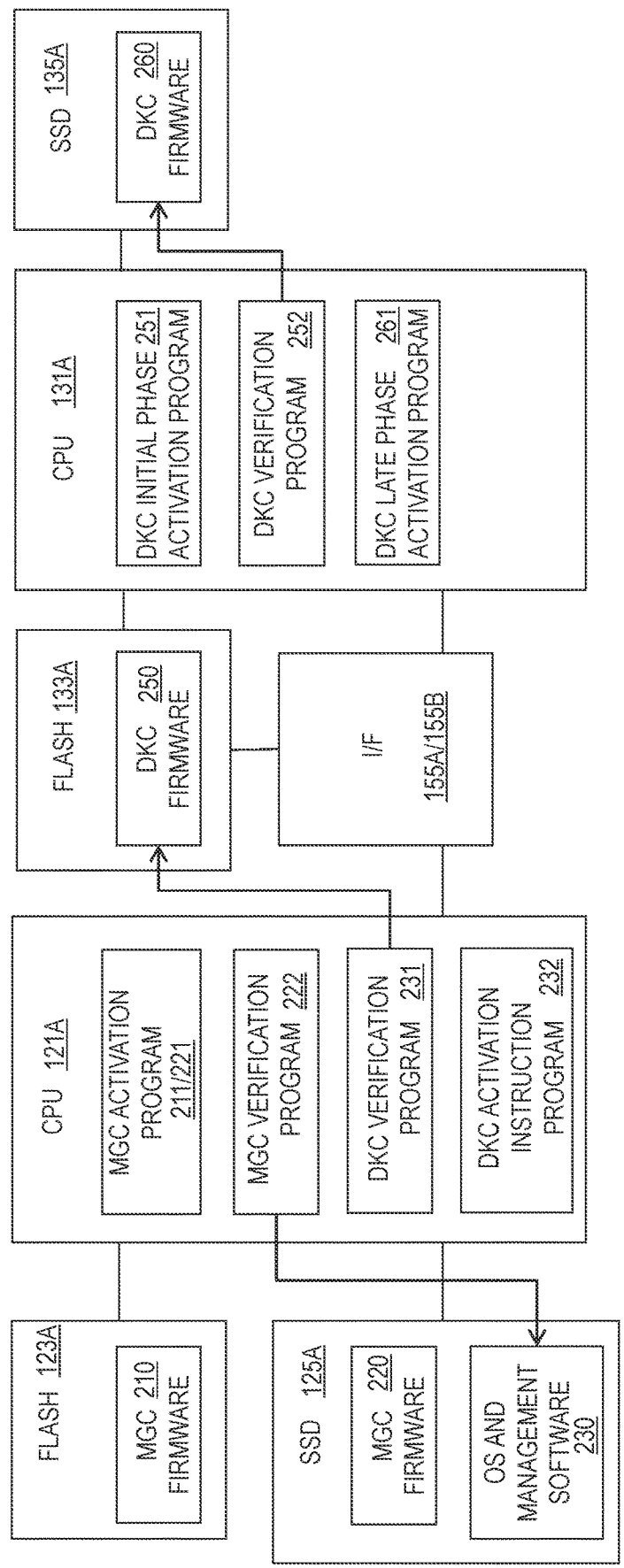
FIG. 4 is a block diagram for illustrating the outline of processing of the programs in the management controller and the disk controller in booting a storage controller.

FIG. 4 is a block diagram for illustrating the outline of processing of the programs in the management controller 120A and the disk controller 130A in booting the storage controller 110A. The management controller 120B and the disk controller 130B perform the same processing.

When startup of the storage controller 110A begins, the CPU 121A of the management controller 120A starts the MGC activation program 211 of the MGC firmware 210 stored in the flash memory 120A. The MGC activation program 211 invokes the other programs of the MGC firmware 210.

The MGC activation program 211 further invokes the MGC activation program 221 of the MGC firmware 220 stored in the SSD 125A. The MGC activation program 221 invokes the other programs of the MGC firmware 220, including the MGC verification program 222.

The MGC verification program 222 verifies the OS and management software 230 stored in the SSD 125A. When the verification of the OS and management software 230 results in determination that there is no tampering, the MGC activation program 221 invokes the programs of the OS and management software 230.

As described above, the OS and management software 230 includes the DKC verification program 231 and the DKC activation instruction program 232. The DKC verification program 231 accesses the flash memory 133A of the disk controller 130A through the internal communication interfaces 155A and 155B to verify the DKC firmware 250.

When the verification of the DKC firmware 250 results in determination that the DKC firmware 250 is normal, the DKC activation instruction program 232 instructs the CPU 131A of the disk controller 130A to activate the disk controller 130A. The CPU 131A executes the DKC initial phase activation program 251 included in the DKC firmware 250 in the flash memory 133A.

The DKC initial phase activation program 251 invokes the DKC verification program 252 included in the verified DKC firmware 250. The DKC verification program 252 accesses the SSD 135A of the disk controller 130A to verify the DKC firmware 260 stored therein. The DKC initial phase activation program 251 invokes the other programs of the DKC firmware 250 in parallel to the verification of the DKC firmware 260.

When the verification of the DKC firmware 260 results in determination that the DKC firmware 260 is normal, the DKC late phase activation program 261 in the DKC firmware 260 is executed. The DKC late phase activation program 261 invokes the other programs in the DKC firmware 260. The DKC firmware 260 is main firmware that defines input and output of host data by the disk controller 130A.

Management Information

FIGS. 5 to 10 provide tables included in the management information held by the storage controllers 110A and 110B. These tables are held as common information by each of the management controllers and disk controllers having redundancy in the system. The management information is stored in, for example, the SSDs of the management controllers and the disk controllers.

FIG. 5 provides a configuration example of a software information table 310. The software information table 310 indicates information on the version of the software to be executed by the management controllers and the disk controllers in the system. The Device column 311 indicates the kind of a controller, namely management controller or disk controller. The Location ID column 312 identifies the storage controller including the management controller or the disk controller. The SW ver. column 313 indicates the version of the software to be executed by the management controller or the disk controller.

FIG. 6 provides a configuration example of a check result management table 320. The check result management table 320 stores the results of verification of the software in the storage controllers. The Date column 321 indicates the day and time of verification and the Device column 322 indicates the kind of the verified controller, namely management controller or disk controller. The Location ID column 323 identifies the storage controller including the management controller or the disk controller. The Result column 324 indicates the result of the verification.

FIG. 7 provides a configuration example of a heartbeat information table 330. The heartbeat information table 330 stores results of alive monitoring on each other performed by the management controllers. The Date column 331 indicates the day and time of receipt of a heartbeat signal and the MGC Location ID column 332 indicates the sender of the heartbeat signal.

FIG. 8 provides a configuration example of a monitoring target DKC management table 340. The monitoring target DKC management table 340 indicates which management controller should verify the software of (monitor) which disk controller. The MGC ID column 341 indicates the ID of a management controller. The DKC ID column 342 indicates the ID of a disk controller. In this example, the IDs of the management controllers and the disk controllers are the same as their Location IDs.

FIG. 9 provides a configuration example of a log management table 350. The log management table 350 manages logs of events that have occurred in the system. The log management table 350 includes log information when tampering occurs. The Date column 351 indicates the date and time of occurrence of an event; the Event ID column 352 indicates the ID of the event; the Event Name column 353 indicates the name of the event; the Severity column 354 indicates the severity of the event; the Device column 355 indicates the kind of the device where the event has occurred; and the Location ID column 356 indicates the ID of the storage controller where the event has occurred.

FIG. 10 provides a configuration example of a report management table 360. The report management table 360 stores records of reports when tampering occurs. The reports are sent to the management apparatus 102, for example.

The Date column 361 indicates the date and time of occurrence of a reported event; the Event ID column 362 indicates the ID of the event; the Event Name column 363 indicates the name of the event; the Severity column 364 indicates the severity of the event; the Device column 365 indicates the kind of the device from which the tampering is detected; and the Location ID column 366 indicates the ID of the storage controller from which the tampering is detected.

Tampering Check and Recovery Processing

Figure 11:
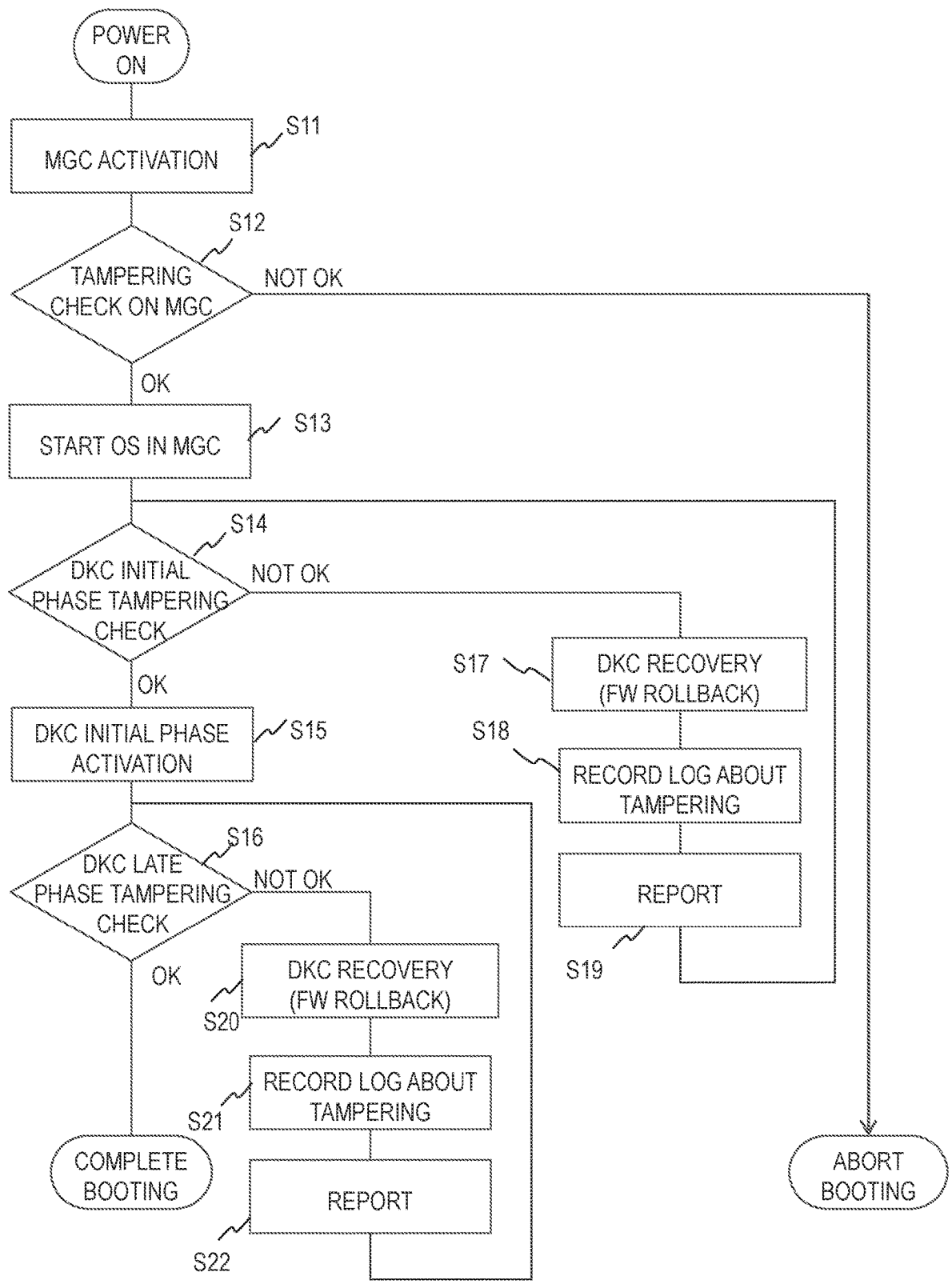
FIG. 11 is a flowchart of an example of a method of tampering check in booting a storage controller described with reference to FIG. 4.

FIG. 11 is a flowchart of an example of a method of tampering check in booting the storage controller 110A described with reference to FIG. 4. The storage controller 110B performs the same processing.

First, activation of the management controller 120A is started (S11). The CPU 121A of the management controller 120A checks whether the software stored in the management controller 120A is tampered (S12). Specifically, subsequent to and in accordance with the MGC activation program 211 stored in the flash memory 123A, the CPU 121A activates the MGC activation program 221 in the MGC firmware 220 stored in the SSD 125A and further, executes the MGC verification program 222 to verify the OS and management software 230 stored in the SSD 125A. The result of the verification is recorded in the check result management table 320.

If no tampering is detected (S12: OK), the CPU 121A starts the OS and the management software in accordance with the MGC activation program 221 (S13). The management software is started after the OS.

The CPU 121A performs DKC initial phase tampering check in accordance with the DKC verification program 231 in the management software (S14). Specifically, the CPU 121A executes the DKC verification program 231 and accesses the flash memory 133A of the disk controller 130A through the internal communication interfaces 155A and 155B to verify the DKC firmware 250. The disk controller to be verified is designated in the monitoring target DKC management table 340. The verification result is recorded in the check result management table 320.

If no tampering is detected from the DKC firmware 250 (S14: OK), the DKC initial phase activation starts (S15). Specifically, the CPU 121A instructs the CPU 131A of the disk controller 130A to activate the disk controller 130A in accordance with the DKC activation instruction program 232. The CPU 131A starts the DKC initial phase activation program 251 in the verified DKC firmware 250. The CPU 131A starts programs including the DKC verification program 252 in accordance with the DKC initial phase activation program 251.

The CPU 131A performs DKC late phase tampering check in parallel to the DKC initial phase activation (S16). Specifically, the CPU 131A checks whether the DKC firmware 260 stored in the SSD 135A is tampered in accordance with the DKC verification program 252. The verification result is stored to the check result management table 320.

If no tampering is detected from the DKC firmware 260 (S16: OK), the CPU 131A starts the programs of the DKC firmware 260 one after another (DKC late phase activation) in accordance with the DKC late phase activation program 261. As a result, booting the storage controller 110A is completed.

With reference to Step S12, if tampering is detected from the software stored in the management controller 120A (S12: NOT OK), booting the storage controller 110A is aborted because the reliability of the management controller 120A is impaired. This action enhances the reliability of the storage controller 110A.

With reference to Step S14, if tampering is detected from the DKC initial phase tampering check (S14: NOT OK), the CPU 121A of the management controller 120A recovers the disk controller 130A in accordance with the DKC verification program 231 (S17).

Specifically, the CPU 121A identifies the version of the software of the disk controller 130A with reference to the software information table 310 and replaces the DKC firmware from which tampering is detected with the backup of the DKC firmware of the identified version. The backup is stored in the flash memory 133A of the disk controller 130A, for example.

The CPU 121A further records a log of the tampering indicating execution of recovery to the log management table 350 in accordance with the DKC verification program 231 (S18). Subsequently, the CPU 121A reports detection of tampering and execution of recovery to the management apparatus 102 (S19). The reported information is recorded in the report management table 360. Thereafter, the flow returns to Step S14. If tampering is detected from the recovered software, recovery is performed with different backup software or the booting is aborted.

With reference to Step S16, if tampering is detected from the DKC late phase tampering check (S16: NOT OK), the CPU 131A of the disk controller 130A recovers the disk controller 130A in accordance with the DKC verification program 252 (S20).

The CPU 131A recovers the DKC firmware 260. In an embodiment of this specification, the DKC firmware 260 are divided into a plurality of software cores and the backup of the DKC firmware 260 is managed in units of software cores. The CPU 131A performs tampering check and necessary recovery in units of software cores. This configuration enables efficient recovery. Instead of or in addition to the DKC firmware 260, the DKC firmware 250 can be divided in software cores.

The CPU 131A identifies the version of the software of the disk controller 130A with reference to the software information table 310 and replaces the core of the DKC firmware 260 from which tampering is detected with the backup of the DKC firmware of the identified version. The backup is stored in the SSD 135A of the disk controller 130A, for example.

The CPU 131A further records a log of the tampering indicating execution of recovery to the log management table 350 in accordance with the DKC verification program 252 (S21). Subsequently, the CPU 121A reports the detection of tampering and the execution of recovery to the management apparatus 102 (S22). The reported information is recorded in the report management table 360. Thereafter, the flow returns to Step S16. If tampering is detected from the recovered software, recovery is performed with different backup software or the booting is aborted.

Figure 12A:
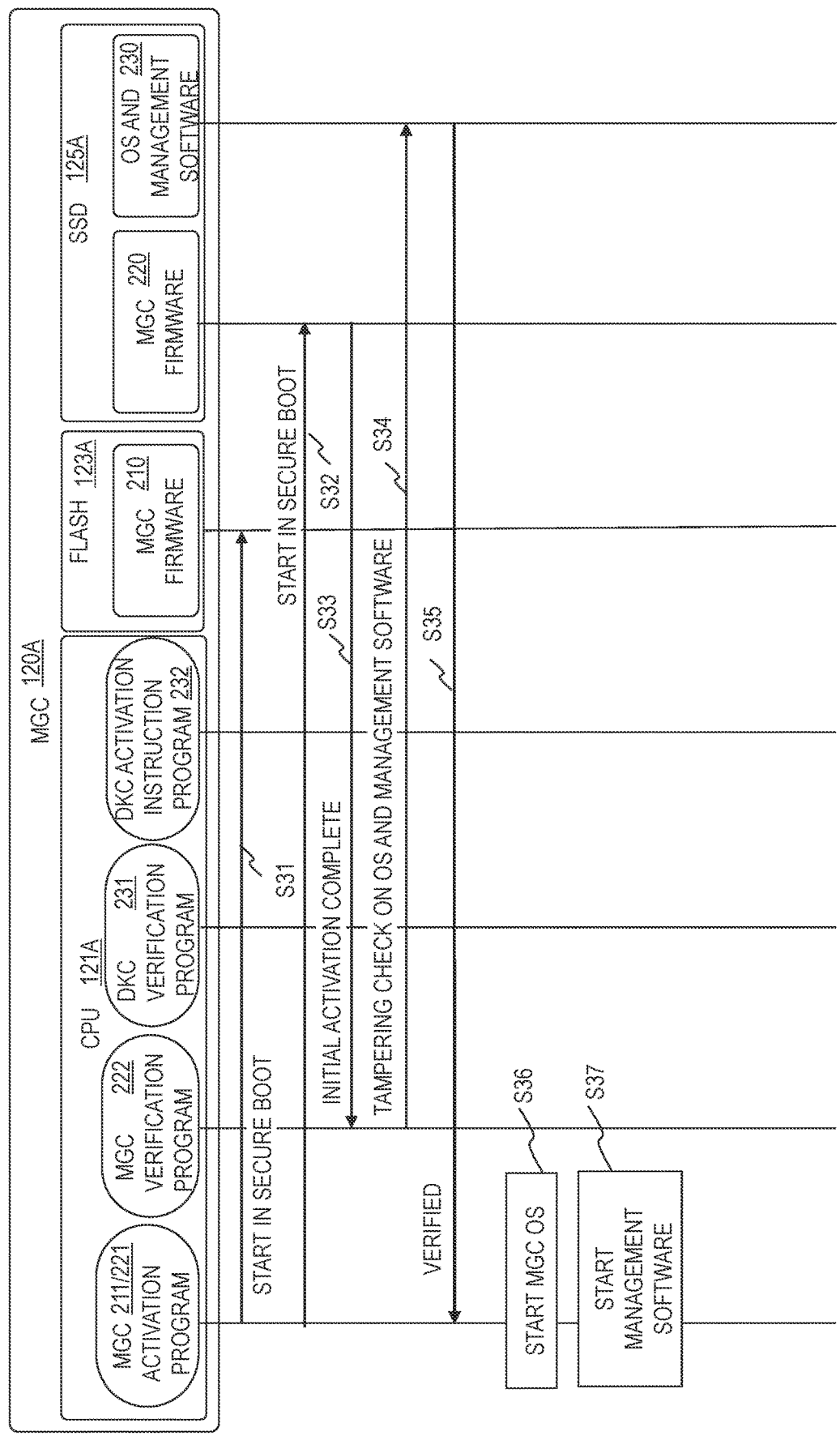
FIG. 12A is a sequence diagram illustrating an example of a method of verifying the software stored in a management controller in booting a storage controller.
Figure 12B:
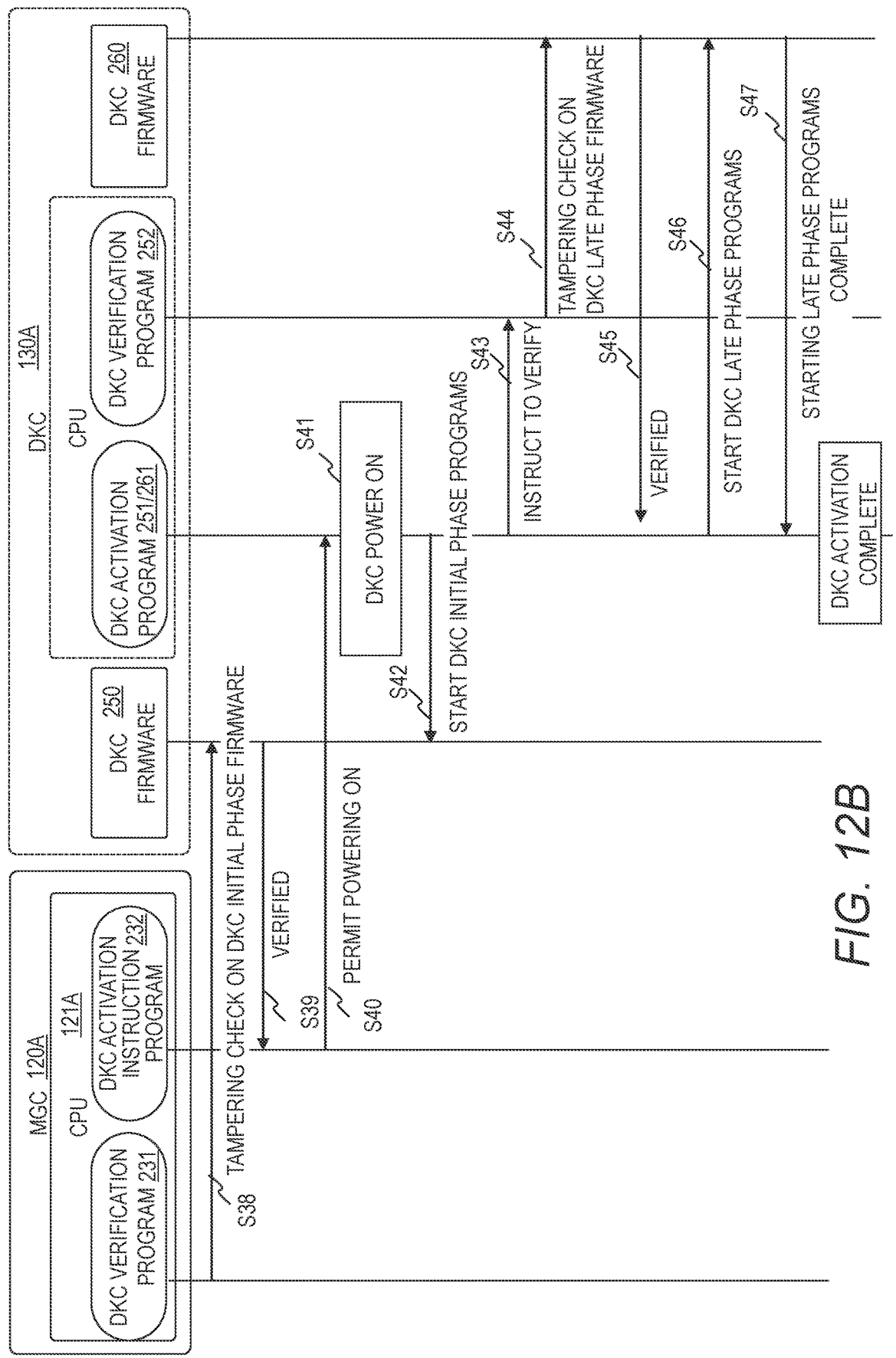
FIG. 12B is a sequence diagram illustrating an example of a method of verifying the software stored in a disk controller in booting a storage controller.

FIG. 12A is a sequence diagram illustrating an example of a method of verifying the software stored in a management controller in booting a storage controller. FIG. 12B is a sequence diagram illustrating an example of a method of verifying the software stored in a disk controller in booting a storage controller. As described above, after verification of the software in the management controller in FIG. 12A is completed, verification of the software in the disk controller is started. Although the following describes the processing in the storage controller 110A, the same processing is performed in the other storage controller 110B.

With reference to FIG. 12A, the MGC activation program 211 of the management controller 120A invokes the other programs of the MGC firmware 210 in the flash memory 123A in a secure boot mode (S31). The MGC activation program 211 further invokes the MGC activation program 221 of the MGC firmware 220 in the SSD 125A in a secure boot mode.

The MGC activation program 221 invokes the other programs of the MGC firmware 220 in a secure boot mode (S32). When the firmware 210 and 220 in the management controller 120A has started (S33), the MGC verification program 222 verifies the OS and management software 230 in the SSD 125A (S34). If the verification result indicates no tampering (S35), the MGC activation program 221 invokes the OS in the OS and management software 230 (S36) and thereafter, invokes the management software (S37).

Next, activating the disk controller 130A is described with reference to FIG. 12B. The DKC verification program 231 of the management controller 120A verifies the DKC firmware 250 stored in the flash memory 133A of the disk controller 130A (S38). If the verification result indicates no tampering (S39), the DKC activation instruction program 232 in the management controller 120A notifies the disk controller 130A of permission of activation (S40).

The DKC initial phase activation program 251 stored in the flash memory 133A of the disk controller 130A powers on the disk controller 130A (S41). Further, the DKC initial phase activation program 251 invokes the other programs of the DKC firmware 250 in the flash memory 133A one after another (S42).

In response to an instruction to verify the DKC firmware 260 from the DKC initial phase activation program 251 (S43), the invoked DKC verification program 252 verifies the DKC firmware 260 in the SSD 135A (S44). If the verification result indicates no tampering (S45), the DKC late phase activation program 261 in the DKC firmware 260 invokes the other programs in the DKC firmware 260 (S46). The verification and the start of the DKC firmware 260 are performed in parallel to the start of the DKC firmware 250.

When all programs of the DKC firmware 260 have started (S47), activating the disk controller 130A is complete.

Figure 13:
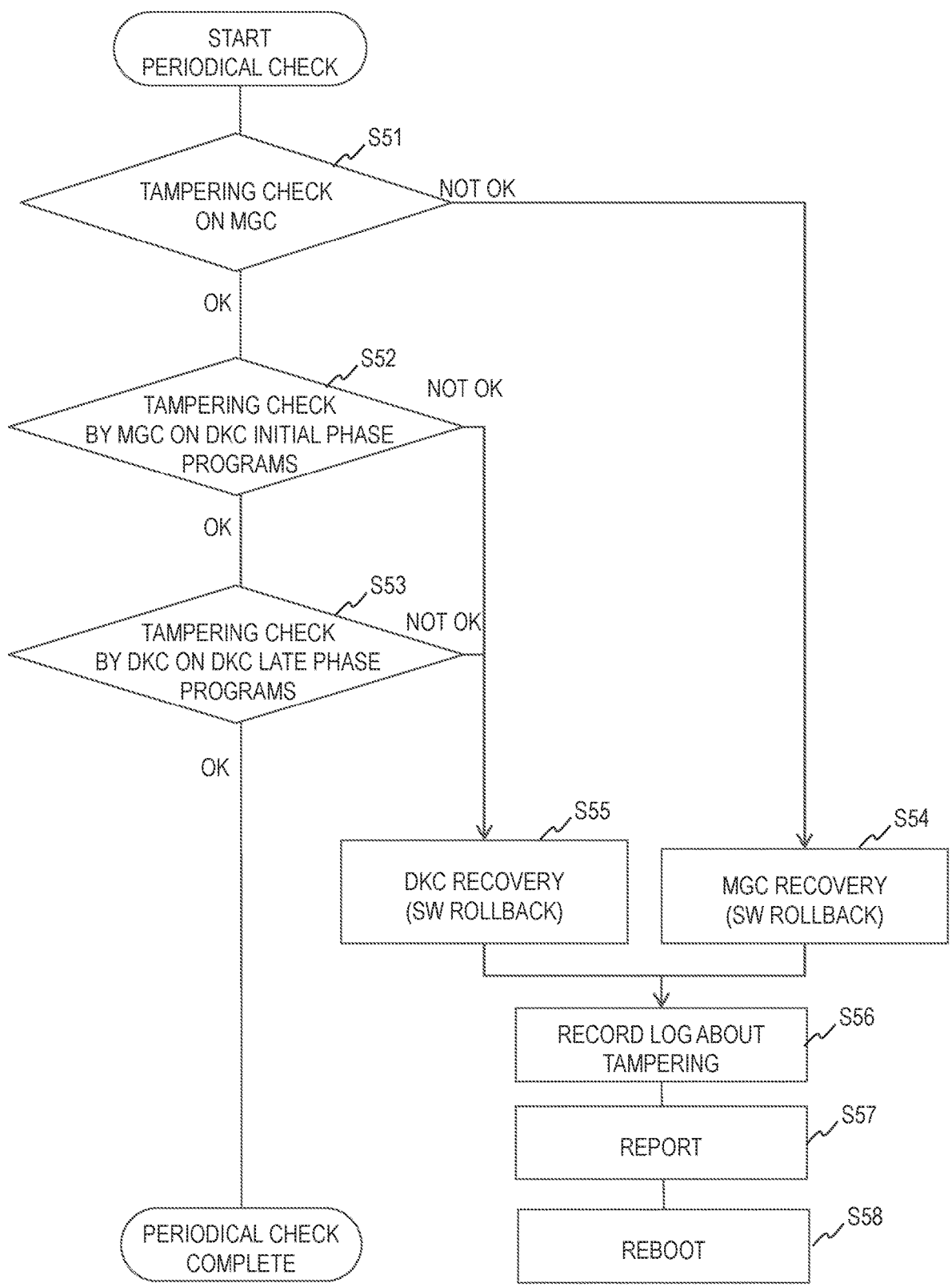
FIG. 13 is a flowchart of an example of periodical software tampering check (verification) by a storage controller.

FIG. 13 is a flowchart of an example of periodical software tampering check (software verification) by the storage controller 110A. Through this processing, reliability of the already activated storage controller is maintained. The storage controller 110B performs the same processing. For example, the periodical tampering check is executed every time a predetermined period has elapsed after the storage controller 110A is activated. The method of the tampering check is basically the same as the tampering check at the startup. As to the periodical check, the management controller executes the processing when the disk controller is in operation, independently from the host data input and output processing of the disk controller. The host data input and output processing of the disk controller can be performed in parallel to the tampering check and recovery processing of the management controller.

The CPU 121A of the management controller 120A checks whether the software sored in the management controller 120A is tampered (S51). Specifically, the CPU 121A executes the MGC verification program 222 to verify the OS and management software 230 stored in the SSD 125A. The verification result is recorded in the check result management table 320.

If no tampering is detected (S51: OK), the CPU 121A executes DKC initial phase tampering check in accordance with the DKC verification program 231 (S52). Specifically, the CPU 121A accesses the flash memory 133A of the disk controller 130A through the internal communication interfaces 155A and 155B and verifies the DKC firmware 250. The disk controller to be verified is designated in the monitoring target DKC management table 340. The verification result is recorded in the check result management table 320.

If no tampering is detected from the DKC firmware 250 (S52: OK), the CPU 131A of the disk controller 130A performs DKC late phase tampering check (S53). Specifically, the CPU 131A verifies the DKC firmware 260 stored in the SSD 135A in accordance with the DKC verification program 252. The verification result is recorded in the check result management table 320. If no tampering is detected from the DKC firmware 260 (S53: OK), the periodical tampering check is complete.

With reference to Step S51, if tampering is detected from the software stored in the management controller 120A (S51: NOT OK), the CPU 121A recovers the OS and management software 230 in accordance with the MGC verification program 222 (S54).

The CPU 121A identifies the version of the software of the management controller 120A with reference to the software information table 310 and replaces the OS and management software 230 from which tampering is detected with the backup of the OS and management software of the identified version. The backup is stored in the SSD 123A of the management controller 120A, for example.

With reference to Step S52, if tampering is detected from the DKC firmware 250 stored in the flash memory 133A of the disk controller 130A (S52: NOT OK), the CPU 121A recovers the DKC firmware 250 in accordance with the DKC verification program 231 (S55). The entire DKC firmware 250 is replaced with the backup of the DKC firmware 250 of the same version.

With reference to Step S53, if tampering is detected from the DKC firmware 260 stored in the SSD 135A of the disk controller 130A (S53: NOT OK), the CPU 131A recovers the DKC firmware 260 in accordance with the DKC verification program 252 (S55). The DKC firmware 260 is replaced in units of software cores with the backup of the DKC firmware 260 of the same version.

The CPU 121A or 131A further records a log of the tampering indicating execution of recovery to the log management table 350 (S56). Subsequently, the CPU 121A or 131A reports detection of tampering and execution of recovery to the management apparatus 102 (S57). The reported information is recorded in the report management table 360. Thereafter, the storage controller 110A is rebooted (S58). Specifically, the CPU 121A or 131A reboots the storage controller 110A in units of recovered software cores.

Cooperative Operation

The foregoing description is mainly about tamper monitoring to be performed by each storage controller. In the following, an example of cooperative operation between management controllers. When a failure occurs in one of the management controllers in a cooperative relationship, another management controller takes over the processing of the failed management controller. Specifically, the management controller takes over the processing for the disk controller under management of the failed management controller.

Figure 14:
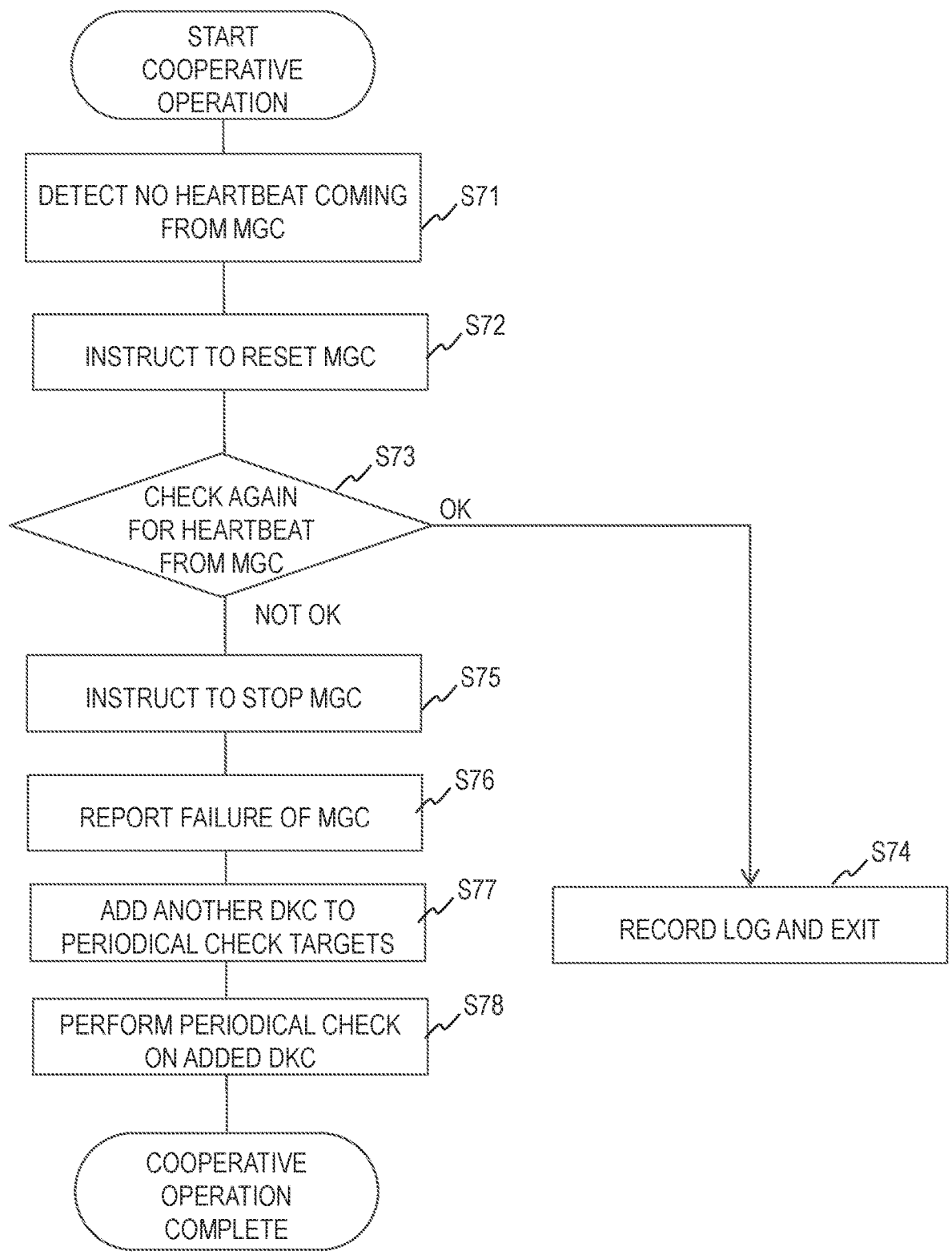
FIG. 14 is a flowchart of an example of coordination of a plurality of management controllers configured to achieve redundancy.

FIG. 14 is a flowchart of an example of the cooperative operation between management controllers in a redundant configuration. The management controllers perform processing for cooperative operation when the disk controllers are in operation, independently from the host data input and output processing of the disk controllers. The host data input and output processing of the disk controllers can be performed in parallel to tampering check and/or recovery processing of the management controllers.

The following describes an example where the management controller 120B detects a failure in the management controller 120A and takes over the processing of the management controller 120A. A plurality of management controllers can be configured to take over processing of one management controller or one management controller can be configured to take over processing of a plurality of failed management controllers.

In the following description, the management controller 120B performs processing in accordance with a not-shown monitoring program unless explicitly stated otherwise. The management controller 1208 monitors the heartbeat signal from the management controller of the monitoring target. The monitoring target can be the management controller indicated in the MGC ID column 341 of the monitoring target DKC management table 340. The results of receiving the heartbeat signal are recorded in the heartbeat information table 330. A heartbeat signal enables constant monitoring of another management controller.

Assume that the management controller 1208 detects that the heartbeat signal from the management controller 120A is stopped (not received) for more than a predetermined period (S71). The management controller 120B instructs the management controller 120A to reset (S72).

If the management controller 120B receives a heartbeat signal from the management controller 120A within a predetermined period (S73: OK), the management controller 120B records the information on the event to the log management table 350 in accordance with the monitoring program (S74).

If the management controller 1208 does not receive a heartbeat signal from the management controller 120A within the predetermined period following the instruction to reset (S73: NOT OK), the management controller 120B instructs the management controller 120A to stop operating (S75). Further, the management controller 120B reports the failure of the management controller 120A to the management apparatus 102 (S76). The reported information is recorded in the report management table 360.

The management controller 120B adds the disk controller 130A of the storage controller 110A including the failed management controller 120A to the targets of its periodical tampering check (S77). Specifically, the management controller 120B updates the monitoring target DKC management table 340 by adding the disk controller 130A to the monitoring targets of the management controller 120B.

The management controller 120B performs periodical tampering check on the disk controller 130A in addition to the disk controller 130B in accordance with the DKC verification programs 231 and 252 (S78). The method of periodical tampering check is as described with reference to FIG. 13.

Figure 15:
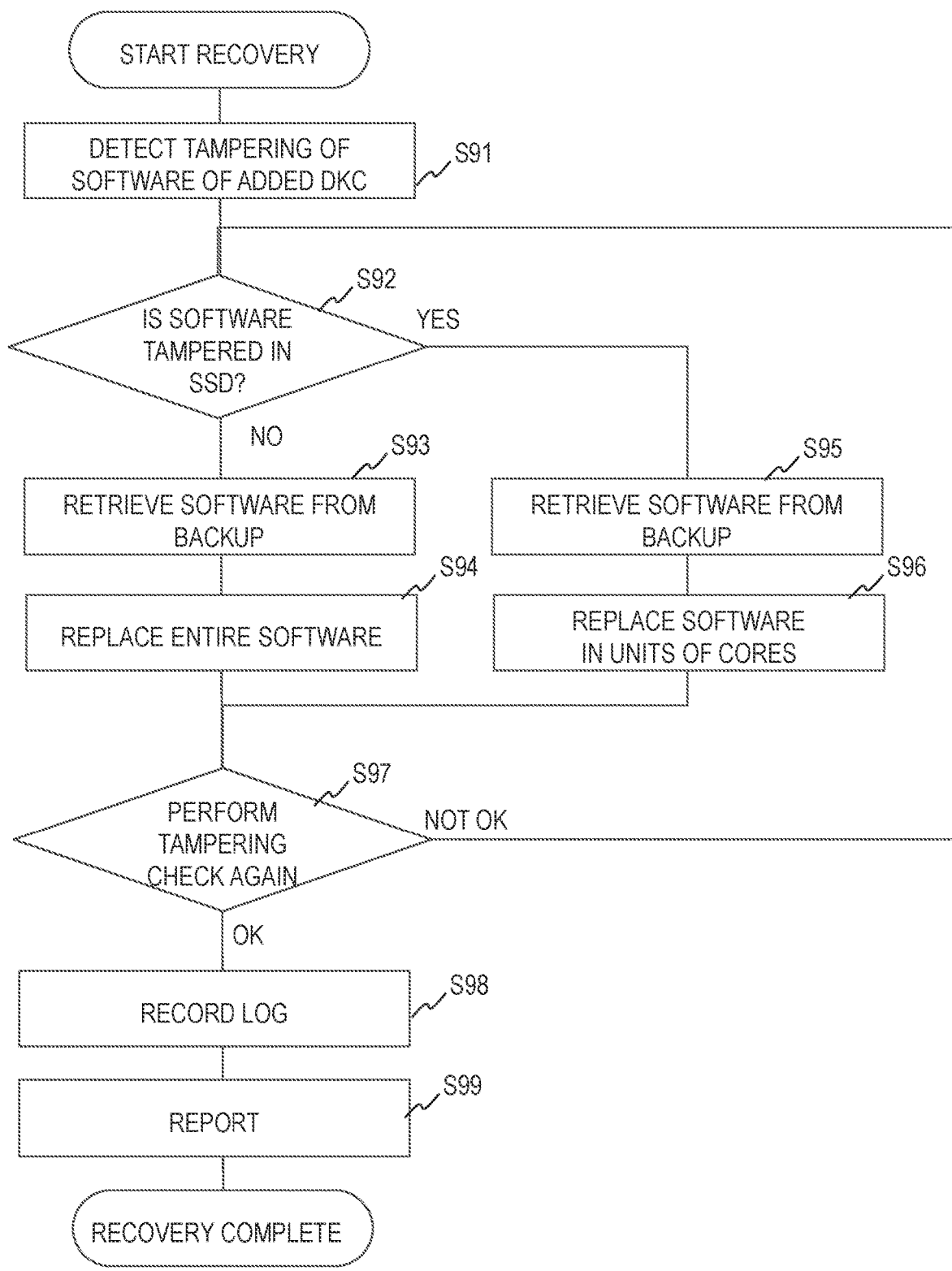
FIG. 15 is a flowchart of an example of processing when a software falsification is detected by another disk controller.

FIG. 15 is a flowchart of an example of the processing when software tampering is detected from the added disk controller. The recovery of the disk controller of a different storage controller is substantially the same as the processing on the disk controller in the same storage controller. The management controller performs the recovery processing independently from the host data input and output processing in the storage system 100. Like the description with reference to FIG. 14, an example where the management controller 120B recovers the software of the disk controller 130A is described.

FIG. 15 illustrates the processing when tampering is detected from either the DKC firmware 250 in the flash memory 133A or the DKC firmware 260 in the SSD 135A. The processing in FIG. 15 is applied to tampering detected from either the flash memory 133A or the SSD 135A.

Assume that the management controller 120B or the disk controller 130A detects software tampering from the disk controller 130A (S91) and that the DKC firmware 250 in the flash memory 133A is tampered (S92: NO). In other words, this is the case where the DKC verification program 231 in the management controller 120B detects tampering of the DKC firmware 250.

The management controller 120B retrieves the DKC firmware 250 from the software backup in the flash memory 133A of the disk controller 130A in accordance with the DKC verification program 231 (S93). The version of the backup to be loaded is determined with reference to the software information table 310.

The management controller 120B replaces the entire DKC firmware 250 in the flash memory 133 with the retrieved backup of the DKC firmware 250 in accordance with the DKC verification program 231 (S94).

If the tampered is the DKC firmware 260 in the SSD 135A (S92: YES), or the DKC verification program 252 in the disk controller 130A detects tampering of the DKC firmware 260, the disk controller 130A retrieves the DKC firmware 260 from the software backup in the SSD 135A in accordance with the DKC verification program 252 (S95).

The disk controller 130A replaces the tampered DKC firmware 260 in units of software cores with the retrieved DKC firmware 260 in accordance with the DKC verification program 252 (S96).

After replacing the software (S94 or S96), the entirety of the replaced DKC firmware 250 or 260 is checked for tampering (S97). If tampering is detected again (S97: NOT OK), the flow returns to Step S92. If no retrievable backup exists, the processing is aborted as unrecoverable.

If no tampering is detected (S97: OK), the management controller 120B or the disk controller 130A records the information on the tampering to the log management table 350 in accordance with the DKC verification program 231 or 252 (S98). Furthermore, the management controller 120B or the disk controller 130A reports the event to the management apparatus 102 in accordance with the DKC verification program 231 or 252 (S99). The reported information is recorded in the report management table 360.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated to a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card or an SD card.

The drawings show control lines and information lines as considered necessary for explanations but do not show all control lines or information lines in the products. It can be considered that most of all components are actually interconnected.

What is claimed is:

1. A storage system comprising:
a first storage controller; and
a second storage controller,
wherein the first storage controller includes:
  a first communication interface;
  a first input and output controller configured to perform input and output processing on host data; and
  a first management controller,
wherein the second storage controller includes:
  a second communication interface coupled to the first communication interface;
  a second input and output controller configured to perform input and output processing on host data; and
  a second management controller,
wherein the first management controller is configured to verify an integrity software for executed by the first management controller and verify an integrity of software for executed by the first input and output controller,
wherein the second management controller is configured to verify an integrity software for executed by the second management controller and verify an integrity of software for executed by the second input and output controller, and
wherein the first management controller is configured to:
  verify the integrity of the software for executed by the second input and output controller, which is stored in the second input and output controller, instead of the second management controller, upon detecting failure is from the second management controller, retrieve a backup of the software for executed by the second input and output controller from the second input and output controller, and replace the software for executed by the second input and output controller with the backup of the software for executed by the second input and output controller.

2. The storage system according to claim 1,
wherein the first management controller and the second management controller are configured to perform the following processing independently from the input and output processing of the first input and output controller and the second input and output controller while the first input and output controller and the second input and output controller are in operation:
verifying, by the first management controller, the software for executed by the first management controller and the software for executed by the first input and output controller;
verifying, by the second management controller, the software for executed by the second management controller and the software for executed by the second input and output controller; and
verifying, by the first management controller in place of the second management controller, the software for executed by the second input and output controller when the failure is detected from the second management controller.

3. The storage system according to claim 1,
wherein the first management controller is configured to:
receive a heartbeat signal from the second management controller; and
determine that the failure occurs in the second management controller when the heartbeat signal from the second management controller is stopped for more than a predetermined period.

4. The storage system according to claim 1,
wherein the first input and output controller includes a first storage device storing initial phase software and a second storage device storing late phase software,
wherein the initial phase software includes an initial phase activation program and a late phase verification program,
wherein the first management controller is configured to verify the initial phase software, and
wherein the first input and output controller is configured to:
start the late phase verification program in accordance with the initial phase activation program after the initial phase software is verified; and
verify the late phase software in accordance with the late phase verification program.

5. The storage system according to claim 1,
wherein the first input and output controller holds initial phase software and late phase software,
wherein the initial phase software includes an initial phase activation program and a late phase verification program,
wherein the first management controller is configured to verify the initial phase software after verifying software to be executed by the first management controller,
wherein the first input and output controller is configured to start programs included in the initial phase software in accordance with the initial phase activation program in parallel to verifying the late phase software in accordance with the late phase verification program after the initial phase software is verified.

6. The storage system according to claim 5,
wherein the first input and output controller includes a first storage device storing the initial phase software and a second storage device storing the late phase software.

7. The storage system according to claim 1,
wherein the software to be executed by the first management controller includes a plurality of cores, and
wherein the first management controller is configured to recover a core from which tampering is detected with a backup core.

8. The storage system according to claim 1,
wherein the software to be verified and executed by the first management controller includes an operating system.

9. A method of managing a storage system including a first storage controller and a second storage controller, the first storage controller including a first communication interface, a first input and output controller configured to perform input and output processing on host data and a first management controller, the second storage controller including a second communication interface coupled to the first communication interface, a second input and output controller configured to perform input and output processing on host data and a second management controller, and the method comprising:
verifying, by the first management controller, an integrity of software for executed by the first management controller and an integrity of software for executed by the first input and output controller;
verifying, by the second management controller, an integrity of software for executed by the second management controller and an integrity of software for executed by the second input and output controller;
verifying, by the first management controller instead of the second management controller, the integrity of the software for executed by the second input and output controller, which is stored in the second input and output controller, upon detecting a failure from the second management controller;
retrieving, by the first management controller, a backup of the software for executed by the second input and output controller from the second input and output controller; and
replacing, by the first management controller, the software for executed by the second input and output controller with the backup of the software for executed by the second input and output controller.

* * * * *